(12) United States Patent
Nagarkar et al.

(10) Patent No.: US 7,856,529 B2
(45) Date of Patent: Dec. 21, 2010

(54) CUSTOMIZABLE MEMORY INDEXING FUNCTIONS

(75) Inventors: Shripad Nagarkar, Weston, MA (US); Rodric Rabbah, Yonkers, NY (US); Anant Agarwal, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 502 days.

(21) Appl. No.: 11/786,581

(22) Filed: Apr. 12, 2007

(65) Prior Publication Data

US 2008/0256328 A1 Oct. 16, 2008

(51) Int. Cl.
*G06F 12/08* (2006.01)
(52) U.S. Cl. .................... 711/118; 711/119
(58) Field of Classification Search .......... None
See application file for complete search history.

(56) References Cited

U.S. PATENT DOCUMENTS

| | | | | |
|---|---|---|---|---|
| 5,530,958 A | * | 6/1996 | Agarwal et al. | 711/3 |
| 5,553,958 A | * | 9/1996 | Bedol | 402/1 |
| 6,275,919 B1 | * | 8/2001 | Johnson | 711/216 |
| 6,434,662 B1 | * | 8/2002 | Greene et al. | 711/108 |
| 6,578,131 B1 | * | 6/2003 | Larson et al. | 711/216 |
| 6,735,670 B1 | * | 5/2004 | Bronstein et al. | 711/108 |
| 7,124,278 B2 | * | 10/2006 | Mori et al. | 711/216 |
| 2003/0204698 A1 | * | 10/2003 | Sachedina et al. | 711/170 |
| 2005/0125592 A1 | * | 6/2005 | Sawdey | 711/3 |
| 2008/0183986 A1 | * | 7/2008 | Yehia et al. | 711/159 |
| 2009/0157972 A1 | * | 6/2009 | Byers et al. | 711/133 |

* cited by examiner

*Primary Examiner*—Than Nguyen
(74) *Attorney, Agent, or Firm*—Lando & Anastasi, LLP (57) ABSTRACT

Methods and apparatus related to memory indexing. Receiving indications of an indexing function for use with a memory. Performing indexing functions with a processor before addressing a memory location. Referencing a customizable lookup table to determine a memory location. Translating a computer program to control a computer system to use a desired indexing function. Determining desired indexing functions based on performance of a computer system.

41 Claims, 7 Drawing Sheets

CUSTOMIZABLE MEMORY INDEXING FUNCTIONS

BACKGROUND

1. Field of Inventions

The instant inventions relate to computer system memory, and the instant inventions more particularly relates to indexing computer system memory.

2. Discussion of Related Art

Computer systems typically store data in large main memory structures. Data may include any information capable of being stored, including machine instructions, application information, etc. These large memory structures have large latencies that can be many orders of magnitude longer than the time used for each processing cycle of a processor. Such large latencies may present a detriment to high performance processing.

To address the large latencies associated with large main memory structures, modern computer systems include one or more caches separating processors from the large main memory structures. The caches serve to amortize costly accesses to the large main memory structures, and improve access to data by locating frequently used data closer to the processors.

Typically, when data is needed by a processor, a cache searches its contents for a memory address of the needed data. This may be achieved by referencing a portion of the memory address of the data in the large main memory structure to index the cache. Such a portion typically includes a set of low-order bits of the address. The remainder of the address is used as a tag to determine if the referenced location in the cache matches the originally referenced memory location in the large main memory structure.

When an address is found in a cache, it is known as a "cache hit." Upon such an event, the data in the cache location is forwarded to the processor. When an address is not found in the cache, it is known as a "cache miss." In the event of a cache miss, the cache forwards the address to either another higher level cache or the large main memory structure. When the request is finally serviced, the cache may update its contents and overwrite previously cached data to store the newly needed data.

The mapping of an address in main memory to a location in a cache is a matter performed in accordance with an indexing function. In common cache designs, a referenced address A is mapped to a location in a cache using the indexing function $h(A)=A \mod S$, where S equals the number of available locations in the cache. This indexing function is known as bit selection. Bit selection is not a perfect indexing function, however, in that two or more addresses may map into the same location, resulting in a cache conflict. This is a common phenomenon in real world applications because caches may be significantly smaller than the space of addresses that a processor can reference (e.g., any location in a large main memory structure). If a sequence of conflicting addresses is encountered, the cache may become less effective as referenced data compete for the same location in the cache.

The performance of modern processors is severely dependent on the performance of their supporting caches. Cache misses that result from competition for the limited data locations in a cache plague typical cache architectures. A common solution to such cache misses is to increase the associativity of the cache. Associativity of a cache refers to a characteristic of a cache to allow a single referenced memory address of the main memory structure to be placed in more than a single location in the cache, as is known in the art. While this strategy may be effective, it comes with significant costs in terms of design complexity. Furthermore, this strategy continues to rely on a cache indexing function that may produce the cache misses in the first place. An ineffective cache indexing function, for example, may continue to cause misses despite associativity because of local hot and cold spots, leaving much of the cache underutilized and much of the cache overutilized.

Certain embodiments of the instant inventions may address or alleviate one or more of the above issues, but other embodiments may not address these specific issues in the prior art and the above discussion is not intended to be limiting.

SUMMARY

In one aspect of some embodiments of the instant inventions, it is recognized that a cache may be managed using a plurality of different indexing functions rather than a single indexing function in order to improve cache performance. An indexing function may be chosen that provides best performance for a particular computer program or portion of a computer program. The computer program may operate a cache to use the chosen indexing function when accessing the cache. The computer programs may be translated (e.g., compiled, interpreted) to include one or more selections of particular indexing functions that may provide an anticipated best performance of the computer program. An indexing function may be developed for a computer program to produce a desired cache performance of that computer program.

One aspect of the instant invention includes a method of operating at least one first memory. In some embodiments, the method comprises receiving a first indication of a first indexing function from a machine readable medium, receiving a first memory address of a main memory structure, and using the first indexing function and the first memory address to access the at least one first memory.

In some embodiments, the at least one first memory includes at least one cache. In some embodiments, the first indication of the first indexing function includes a selection of the first indexing function out of a plurality of indexing functions that may be performed by a memory controller. In some embodiments, receiving the first indication includes receiving at least one of an electronic signal representing the selection and an optical signal representing the selection. Some embodiments further comprise storing the at least one indication of the first indexing function in a temporary memory location.

In some embodiments, the first indication includes at least one machine instruction that perform the first indexing function when executed by a processor. Ii some embodiments, the first indication includes a representation of a lookup table that maps the first memory address to at least one address of the at least one first memory. In some embodiments, using the first indexing function and the first memory address include writing at least one information item to the at least one first memory using the first indexing function and the first memory address, and reading the at least one information item from the at least one first memory using the first indexing function and the first memory address.

Some embodiments further comprise receiving a second indication of a second indexing function, receiving a second memory address of the main memory structure, and using the second indexing function and the second memory address to access the at least one first memory. Some embodiments further comprise clearing the at least one first memory before accessing the at least one first memory. Some embodiments further comprise receiving a second selection of a second indexing function, and using the second indexing function and the first memory address to access at least one second memory. Some embodiments include a processor configured to perform one of the above methods.

One aspect of the instant invention includes a method of translating a program. In some embodiments, the method comprises generating a set of machine instructions for execution by at least one computer system, and including, in the set of machine instructions, at least one first machine instruction identifying at least one first indexing function to be used with at least one first memory of the at least one computer system.

In some embodiments, the at least one first memory includes at least one cache. In some embodiments, the at least one first machine instruction includes a plurality of machine instructions that perform the at least one first indexing function when executed by a processor. In some embodiments, the at least one first machine instruction includes a lookup table that maps memory locations of a main memory structure to memory locations in the at least one first memory. In some embodiments, the at least one first machine instruction includes an input for a cache controller selecting one of a plurality of hardwired indexing functions. In some embodiments, the at least one first machine instruction includes an instruction indicating a write into a temporary memory location.

Some embodiments further comprise including, in the set of machine instructions, at least one second machine instruction identifying at least one second indexing function to be used with the at least one first memory. Some embodiments further comprise determining a position in the set of machine instruction for the at least one second machine instruction. In some embodiments, determining the position includes comparing a first anticipated performance of the at least one first memory using the at least one first indexing function and a second anticipated performance of the at least one first memory using the at least one second indexing function.

Some embodiments further comprise selecting the at least one first indexing function. In some embodiments, selecting includes comparing a first anticipated performance of the at least one first memory using the at least one first indexing function and at least one second anticipated performance of the at least one first memory using at least one second indexing function. Some embodiments further comprise including, in the set of machine instructions, at least one second machine instruction identifying at least one second indexing function to be used with at least one second memory. In some embodiments, translating includes at least one of compiling and interpreting. Some embodiments comprise a machine readable medium having stored thereon a plurality of machine instructions for controlling at least one computer system to perform one of the methods above.

One aspect of the instant invention includes a method of controlling a computer system to perform a plurality of desired operations, wherein the plurality of desired operations includes performing at least one first desired indexing function to access at least one first memory of the computer system.

In some embodiments the at least one first memory includes at least one cache. In some embodiments controlling the computer system includes identifying at least one memory address of a main memory structure, and searching the at least one first memory using the at least one first desired indexing function for a copy of information stored in the at least one memory address. In some embodiments the at least one memory address includes an address of electronic data. In some embodiments controlling the computer system to perform the at least one first indexing function to be used by the at least one first memory of the computer system includes selecting the at least one first desired indexing function from among a plurality of indexing functions hardwired in a memory controller.

In some embodiments controlling the computer system to perform the at least one first indexing function to be used by the at least one first memory of the computer system includes controlling a processor to execute a set of machine instructions that perform the first desired indexing function. In some embodiments controlling the computer system to perform the at least one first indexing function to be used by the at least one first memory of the computer system includes storing a lookup table that maps main memory addresses to addresses of the at least one first memory, and referencing the lookup table to access the at least one first memory.

In some embodiments the plurality of desired operations includes performing at least one second indexing function to access at least one first memory of the computer system. In some embodiments the plurality of desired operations includes performing at least one second indexing function to access at least one second memory of the computer system. Some embodiments include a machine readable medium having stored thereon a plurality of machine instructions for controlling at least one computer system to perform the one of the methods above.

One aspect of the instant invention includes an apparatus comprising at least one memory element configured to store a plurality of information items, and at least one processing element configured to access the plurality of information items using a plurality of indexing functions, and configured to receive at least one indication of at least one of the plurality of indexing functions.

In some embodiments the at least one memory element includes at least one cache. Some embodiments further comprise at least one special purpose register. In some embodiments the at least one processing element is configured to perform the at least one of the plurality of indexing functions and store a result in the at least one special purpose register. Some embodiments further comprise at least one memory control element configured to receive a selection of the at least one of the plurality of indexing functions from the at least one processing element, and configured to perform each of the plurality of indexing functions.

In some embodiments the at least one indication includes a representation of a lookup table. In some embodiments the plurality of information items includes electronic data. In some embodiments the at least one memory element includes a plurality of memory elements configured to operate hierarchically. In some embodiments the at least one memory element includes at least one of a direct mapped cache and a set associative cache. In some embodiments the at least one processing element includes a plurality of processing elements.

One aspect of the instant invention includes a method of determining at least one desired indexing function. In some embodiments the method comprises providing a plurality of possible indexing functions, evaluating performance of a computer program using at least a portion of the plurality of possible indexing functions, and selecting the at least one desired indexing function from among the plurality of possible indexing functions based, at least in part, on the evaluated performance of the computer program.

In some embodiments the plurality of possible indexing functions includes each indexing function that may be performed using less than a maximum number of simple operations on a memory address. In some embodiments the simple operations include arithmetic and logic operations. In some embodiments the at least one desired indexing function includes a plurality of desired indexing functions. In some embodiments selecting the at least one desired indexing function includes selecting a location in the computer program during which each of the plurality of desired indexing functions should be used to access a memory based, at least in part, on the evaluated performance of the computer program.

In some embodiments the memory includes a cache. Some embodiments include a machine readable medium having stored thereon a plurality of machine instructions for controlling at least one computer system to perform a method above. Some embodiments further comprise executing the computer program. In some embodiments, executing is performed after providing and evaluating. In some embodiments, providing and evaluating are performed during executing.

Further features and advantages of the instant inventions as well as the structure and operation of various embodiments of the instant inventions are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is shown in various figures is represented by a like numeral. For purposes of clarity, not every component may be labeled in every drawing. In the drawings.

DETAILED DESCRIPTION

The instant inventions are not limited in its application to the details of construction and the arrangement of components and acts set forth in the following description or shown in the drawings. The instant inventions capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

One aspect of some embodiments of the instant inventions relates to a memory that may be indexed using a plurality of different indexing functions. In some embodiments, such a memory may be indexed by one of the plurality of indexing functions at various times during operation of the memory. The one of the plurality of indexing functions may be chosen to improve an anticipated performance of the memory, as is described in more detail below.

Indexing functions should be understood to include any function that may translate or map a first address into a second address, no matter how implemented or determined. For example, an indexing function may translate a set of main memory addresses into a set of second memory addresses. The first and second addresses, in some circumstances may be the same. In other circumstances, the first and second addresses may be different. The first and second addresses may be different lengths or the same lengths. An indexing function may, for example, be based on the performance of logical operations and/or arithmetic operations on the first address to obtain the second address. An indexing function may be implemented as a lookup table that stores precomputed values of the indexing function.

Although the below embodiments are described with reference to indexing of a cache, it should be understood that the present invention is not limited to indexing of a cache. In some other embodiments, for example, any local memory of a processor or computer system may be indexing using the techniques disclosed herein.

As described above, caches play an important role in modern computing because of large latencies associated with large main memory structures. For example, a typical modern processor (e.g., a processor operating at one to three gigahertz) may experience, for example, one hundred to more than three hundred processor cycles in the time needed to access a typical large main memory structure (e.g., a DRAM). Reduction of cache misses can lead to significant performance improvements in computer systems by avoiding delays associated with access to large main memory structures.

In one embodiment of the instant inventions, a computer program may identify one of the plurality of indexing functions that is hoped to provide better cache performance for the execution of the computer program. In one aspect of some embodiments of the instant inventions, a computer program may identify the one of the plurality of indexing function to a hardwired specialized hardware that performs the indexing function. In another aspect of some embodiments of the instant inventions, a computer program may identify lookup table values that may be used to map main memory addresses to cache addresses. In some embodiments, a computer program may identify or perform subsequent indexing functions during the execution of a computer program. Such subsequent indexing functions may provide anticipated improvements in cache performance for subsequent portions of the computer program.

In another aspect of some embodiments of the instant inventions, a computer program may be translated for execution on a computer system. Such translating may take the form of compilation or interpretation of the computer program. In some embodiments, a translated version of a computer program may include a set of instructions to perform a desired indexing function. In some embodiments, an interpreted version of a computer program may include an instruction identifying a desired indexing function.

In yet another aspect of some embodiments of the instant inventions, at least one desired indexing function is determined for use with a computer program. The desired indexing function may provide an anticipated desired cache performance during the execution of the computer program.

Figure 1:
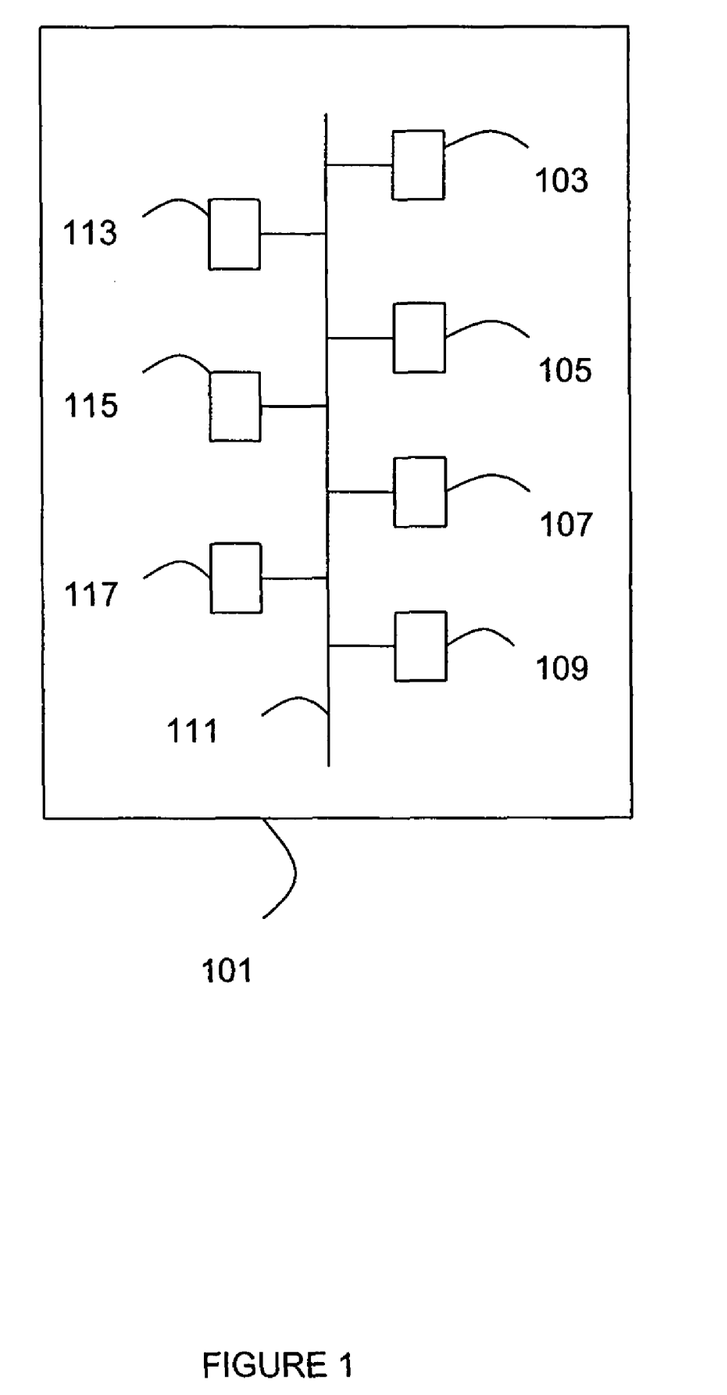
FIG. 1 shows an example general purpose computer according to some embodiments of the instant inventions.

It should be appreciated that the various processes described herein may be implemented by computer systems (e.g., a general purpose computer 101 as shown in FIG. 1 and/or another computing device). A computing device may include a specialized or general purpose computing device such as a cellular phone, a personal digital assistant, integrated computing devices and/or any other portable or non-portable computing system that is not a general purpose computer.

Computer systems, such as general purpose computer system 101, may include at least one processor 103. Processor 103 may include one or more microprocessors, such as Intel® Pentium®, Centrino®, Core®, XScale®, Motorola PowerPC; AMD Athlon, Turion or Opteron; Sun UltraSPARC; Hewlett-Packard PA-RISC processors, application specific integrated circuits, ARM processors, integrated processors such as digital signal processors (DPSs) available from Texas Instruments, and/or like devices or combinations thereof. In some implementations, processor 103 may be a multi-cored or tiled processor such as Intel's Polaris processor. Typically, processor 103 will receive/request instructions and application information, and execute those instructions using the application information, thereby performing one or more computer programs.

In some implementations a computer system may include a plurality of processors. Although the description below includes particular reference to a single processor computer system, it should be understood that embodiments of the instant inventions may include multiprocessor computer systems.

A computer system (e.g., general purpose computer system 101) may include one or more persistent memory structures 105. Persistent memory structure 105 may include a machine readable and/or writeable non-volatile medium. In some implementations, the one or more persistent memory structures may include a disk drive and/or other device for storing data that is coupled to the processor 103. Persistent memory structure 105 is typically used for storing data for/during operation of a computer system. Such data may be read from persistent memory structure 105 into a main memory structure describe below during operation of the computer system.

As mentioned above, a computer system may include at least one main memory structure 107. Main memory structure 107 may include a machine readable and/or writeable medium on which data for operation of the computer system may be stored. Main memory structure 107 may be a volatile, random access memory such as a dynamic random access memory (DRAM) or static random access memory (SRAM). In some integrated computer systems, main memory structure 107 may include one or more EEPROMs or flash memories. Typically, in operation, processor 103 causes data to be read from main memory structure 107 into processor 103 (e.g., into registers of processor 103) and written back into main memory structure 107 after processor 103 has finished processing the data. In some implementations, the data may then be written to persistent memory structure 105. It should be recognized that embodiments of the instant inventions are not limited to a particular main memory or persistent memory arrangement, structure, or operation.

As mentioned above, because typical main memory structures are large and relatively slow compared to modern processors, a computer system (e.g., general purpose computer system 101) may include a cache element 109. Caches may store instructions and/or other data together or separately (e.g., separate instruction cache or unified cache). Cache element 109 may include a significantly smaller and faster memory than main memory structure 107. In some implementations, cache element 109 may include a hierarchical cache structure in which multiple levels of caches are used to improve cache performance. In some implementations, cache element 109 may include SRAM and/or DRAM. Cache element 109 may be in addition to or an alternative to a cache integrated within processor 103. An integrated cache is discussed in more detail below with respect to FIG. 2.

Components of a computer system (e.g., general purpose computer system 101) may be coupled by an interconnection mechanism such as network 111, which may include one or more busses (e.g., between components that are part of a same machine) and/or a network (e.g., between components that reside on separate discrete machines). The interconnection mechanism may enable include any element that enables communication. The interconnection mechanism may enable electronic and/or optical communication.

In some embodiments, a computer system, such as general purpose computer 101, may include input devices and/or output devices (e.g., a keyboard 113, mouse, trackball, microphone, touch screen, printing device, display screen 115, speaker, network interface 117).

In some embodiments, a computer system may execute an operating system which may include, for example, the Windows-based operating systems (e.g., Windows NT, Windows 2000 (Windows ME), Windows XP, Windows Vista) available from the Microsoft Corporation, MAC OS System X operating system available from Apple, Inc., one or more of the Linux-based operating system distributions (e.g., the Enterprise Linux operating system available from Red Hat, Inc.), the Solaris operating system available from Sun Microsystems, or UNIX operating systems available from various sources. Many other operating systems may be used, and many embodiments of the instant inventions are not limited to any particular operating system.

Processor 103 and an operating system may define a computer platform for which programs stored as data on persistent memory structure 105 and/or main memory structure 107 may be written in various programming languages, including an object-oriented programming language, such as SmallTalk, Java, C++, Ada, Python, or C# (C-Sharp), functional programming languages, scripting programming languages such as JavaScript, and/or logical programming languages. Some platforms may include non-programmed environments (e.g., documents created in HTML, XML or other format that, when viewed in a window of a browser program, render aspects of a GUI, or perform other functions). Compiler programs and/or virtual machine programs executed by computer systems generally translate higher level programming languages to generate sets of machine instructions that may be executed by processor 103 to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

Figure 2:
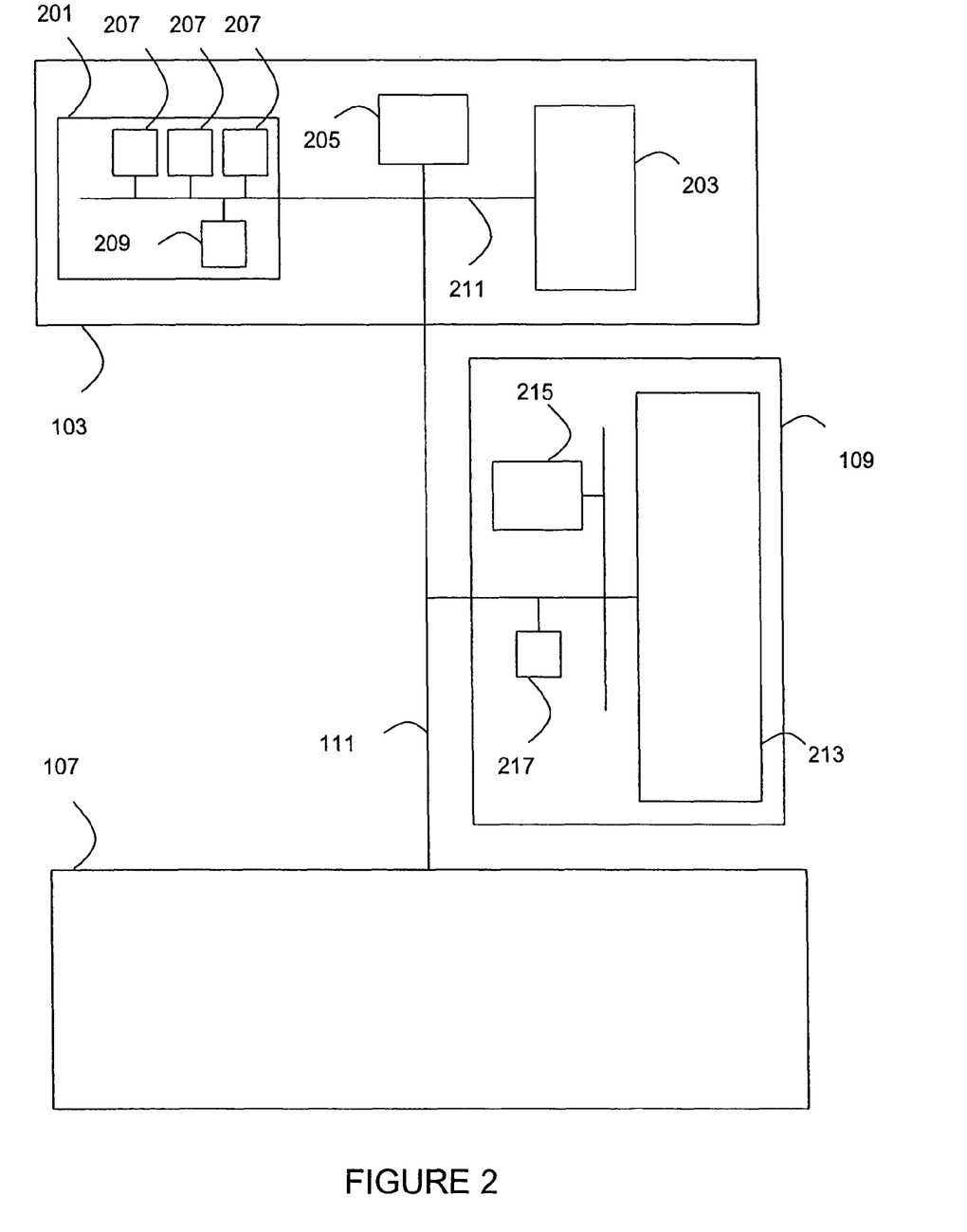
FIG. 2 shows an example diagram of a main memory structure, a cache element, and a processor according to some embodiments of the instant inventions

FIG. 2 shows a more detailed structural diagram of main memory structure 107, cache element 109, and processor 103 according to some embodiments of the instant inventions. As shown in FIG. 2, processor 103 may include a processing element 201 configured to execute instructions and/or manipulate information as is well known in the art, an integrated (i.e., onboard) cache 203, and an integrated cache controlling element 205 configured to provide access to integrated cache 203. Processor 103 may also include a plurality of additional elements that are not shown. In some implementations, integrated cache controlling element 205 may not be a separate element as shown, but rather may be a part of processing element 201 or integrated cache 203, but is shown here as a separate element, in part, for convenience of illustration. In some implementations, integrated cache controlling element 205 may not be present at all, and instead, the processing element 201 may precomputed cache addresses, as is discussed in more detail below.

In some embodiments, processing element 201 may include a plurality of general purpose registers 207 that store data locally to processing element 201, as is well known in the art. Such general purpose registers 207 provide high speed access to instructions currently being executed and/or information currently being manipulated.

In some embodiments, processing element 201 may include at least one special purpose register 209. Special purpose register 209 may be used to store data associated with special characteristics a set of instructions being executed by the processor. For example, as will be described in more detail below, in some implementations, data stored in one or more special purpose registers 209 may be used to access integrated cache 203.

In some implementations, a communication network 211 may enable communication among various elements of processor 103. Communication network 211 may include a high speed bus.

In some embodiments, integrated cache 203 may allow relatively fast access to data stored thereon. By integrating cache 203 within the processor, this speed may be significantly faster than offboard caches such as those described below with respect to cache element 109.

In some implementations, integrated cache 203 and cache element 109 may act as a hierarchical cache system. Integrated cache 203 may be the smallest and fastest cache within the hierarchical system and may therefore be the first referenced cache. If integrated cache 203 cannot service a request (e.g., the referenced address is not found in integrated cache 203), cache element 109 may be referenced next. Cache element 109 may be slower and larger than cache 203, but still faster and smaller than main memory structure 107. If cache element 109 cannot service the request, then main memory structure 107 may be referenced. In some implementations, one or both of cache 203 and cache element 109 may themselves include hierarchical cache structures.

Cache element 109 may include an offboard cache 213 in which data is stored, an offboard cache controlling element 215 through which access to the offboard cache may be provided, and a temporary storage element 217. Similar to integrated cache controlling element 205, the offboard cache controlling element 215 may provide access to the offboard cache 213, in a variety of manners, some of which are discussed in more detail below. Similar to the special purpose register, the temporary storage element 217 may be used to address a location in the cache, as will be discussed in more detail below. It should be recognized that some embodiments of cache element 109 may not include these elements and/or may include other additional or alternative elements. For example, temporary storage element 217 may be located within processor 103, for example, as another special purpose register. In other implementations, offboard cache controlling element 215 may also be part of processor 103, or not present at all.

In operation, when processor 103 requests data, cache 203 may search its contents for a memory address of the needed data. If the address is found in cache 203, the data may be supplied to the processor from cache 203 without the need to access main memory structure 107 and/or a higher level cache (e.g., part of cache element 109).

If the address is not found in cache 203, cache 203 may forward the address to either another higher level cache (e.g., another integrated cache (not shown) or part of cache element 109), if present, or main memory structure 107 if no higher level caches are present. Higher level caches may act substantially similarly to cache 203 and continue forwarding the address to a higher level cache or main memory structure 107 until the address is found. In some implementations, rather than referencing caches and the memory structure in series, some or all of the caches and/or the memory structure may be referenced in parallel. When the address is found, the cache hierarchy may be updated so that each cache contains a copy of the data in accordance with a data replacement policy. The well known "least recently used" replacement policy is the most common data replacement policy; however, embodiments of the instant inventions are not limited to any particular data replacement policy.

To improve the speed of a cache lookup, some implementations may limit the locations within the cache in which a copy of a referenced memory address may be stored according to a storage policy. Such limiting may thereby reduce the number of cache locations that need be searched to determine if a copy of the referenced memory location is stored in the cache. Caches that map referenced memory locations to only a single cache location are called directly mapped caches. Caches that map referenced memory locations to multiple cache locations are called set associative caches or d-way associative caches, where d represents the number of different cache locations to which a single memory reference may be mapped. If a cache allows a referenced memory location to occupy any cache location, it is called a fully associative cache. Associative caches are more complex to design than directly mapped caches, consume more energy, and typically have longer access latencies. Although embodiments of the instant inventions are described in more detail below referring to a directly mapped cache, it should be understood that some embodiments of the instant inventions are not limited to directly mapped caches.

In some embodiments, when a cache controller (e.g., integrated cache controlling element 205, offboard cache controlling element 215) receives a referenced address, the cache controller will typically determine which locations within the cache may be storing the referenced data according to a storage policy of the cache. Determining such locations may include translating the referenced memory address to one or more cache locations using an indexing function. In some simple implementations, an indexing function may include determining the last bit or bits of a referenced address. Such bits may then be used to reference the memory of the cache In some embodiments of the instant inventions, a cache controller may be configured to enable a plurality of different indexing functions. In some implementations, for example, a cache controller may include hardwired specialized hardware including a plurality of processing paths, each processing path being configured to perform one of the plurality of different indexing functions. The indexing functions may be performed, for example, by a plurality of arithmetic and/or logic operators (e.g., xors, ands, ors, multipliers, modulos, adders, etc.).

In some embodiments, the cache controller may include a multiplexer into which each of the different processing paths that implement each of the different indexing functions provide input. The output of the multiplexer and thereby the indexing function used by the cache controller may be selected by a separate input to the multiplexer. Selection of multiplexer output is well known in the art. In one implementation, the output may be selected by a value stored in a particular memory location. For example, integrated cache controlling element's 205 output may be selected by the value of special purpose register 209. As another example, the offboard cache controlling element's 215 output may be selected by a value of the temporary storage element 217. In operation, the cache controller may receive an address of a memory location in main memory and output a cache address according to the selected indexing function. The address in the cache address may be used to access a cache location, as is well known in the art.

In other embodiments, rather than implementing multiple indexing function in hardwired specialized hardware, an indexing function may be implemented as a customizable look up table stored, for example in the cache controller or a temporary memory location (e.g., special purpose register, temporary storage location). The lookup table may map the locations of memory in the main memory to locations in a cache. A lookup table may implement a desired indexing function as a set of stored outputs of the indexing function. In some implementations, when an address is requested from main memory, the lookup table may be referenced to identify a corresponding address in a cache. The cache may then be referenced using that address. In some implementations, a lookup table may use a subset of the total main memory address as an index into the lookup table to determine the corresponding address in the cache.

In some embodiments, a lookup table may be loaded for the execution of a particular computer program. For example, in some implementations, a lookup table may be loaded at the beginning of the execution of a computer program. In some implementations, a lookup table may be changed during the execution of the computer program (e.g., in response to an instruction, in response to behavior of a computer program). In some implementations, loading a lookup table may include loading a set of information from a stored memory locations.

In still other embodiments, rather than implementing multiple indexing functions in either hardwired specialized hardware or lookup tables, indexing functions may be implemented by processor 103, for example with processing element 201. For example, processing element 201 may perform one or more operations to translate an address in main memory to a cache address and store the result in a temporary memory location (e.g., special purpose register 209 or temporary memory element 217). The stored result may then by used as an address and/or in addition to an address in a load instruction from the cache. Such an implementation may allow for fully customizable indexing functions but may use additional processor cycles to implement. Because of the large latency differences between processor 103 and main memory structure 107, these additional processing cycles may result in an overall benefit to performance. Furthermore, because modern processors may have a plurality of parallel processing paths, some of which may be idle at any time, in many situations, the extra processing cycles may be performed using an otherwise idle processing path thereby not wasting processing cycles.

In one example implementation in which indexing functions are performed by processing element 201, a series of instruction may be performed on data stored in a special purpose register. For example, an instruction sequence such as: LD R1, ADDY; XOR SPR R1, OPERATOR; LD R2, R1, SPR, may be performed to load a main memory location ADDY into register R2. The instruction LD R1, ADDY may first load the address ADDY into register R1. Next, the value of ADDY may be xored with a value indicated by OPERATOR, and the result may be stored in the special purpose register SPR. This xoring of the address ADDY represents the performance of one example indexing function, but it should be understood that any set of operations may be performed. Then, the LD instruction may load data from the address ADDY, which is stored in R1, into register R2. In a traditional LD instruction only a single address is provided (e.g., the load instruction would traditionally be LD R2, R1). The modified LD instruction used in this example identifies both the original main memory address and the indexed address stored in the special purpose register SPR. A cache in such an implementation may be configured to accept both values as input, use the special purpose register SPR value as an index into the cache, and if no matching address is found, pass the address from register R1 to a higher level cache or a main memory. In some implementations, a LD instruction may have an additional address parameter for each cache in a cache hierarchy.

Regardless of the technique for implementing multiple indexing functions, a cache may be cleared when an indexing function is changed. Such clearing may be performed so that future reads from the cache using a new indexing function do not result in outdated/incorrect data being read from the cache. Clearing of cache memory is known generally in the art, and may be performed in any manner in the context of the instant inventions, based on the disclosure provided herein.

It should be recognized that embodiments of the instant inventions are not limited to any set of indexing functions. In some implementations, indexing function may be included that may be likely to produce a substantially random cache reference sequence. The following table shows an example set of indexing functions that may be used in some implementations of the instant inventions.

$$B_0...B_{31} = A_0...A_{31}$$

$$B_0...B_{b-1} = A_0...A_{b-1}$$

$$B_b...B_{\frac{s}{3}-1} = \left[A_b...A_{\frac{s}{2}}\right] \oplus \left[A_s...A_{s+\frac{s}{3}}\right]$$

$$B_{\frac{s}{2}}...B_{31} = A_{\frac{s}{2}}...A_{31}$$

$$B_0...B_{b-1} = A_0...A_{b-1}$$

$$B_b...B_{s-1} = [A_b...A_{s-1}] \oplus [A_s...A_{2*s-1}]$$

$$B_s...B_{31} = A_s...A_{31}$$

$$B_0...B_{b-1} = A_0...A_{b-1}$$

$$B_b...B_{s-1} = [A_b...A_{s-1}] \oplus [A_{32-b-4}...A_{32-b-8}]$$

$$B_s...B_{31} = A_s...A_{31}$$

$$B_0...B_{s-4} = A_0...A_{s-4}$$

$$B_{b-3}...B_{s-1} = [A_b...A_{s-3}] \oplus [A_s...A_{s+2}]$$

-continued $B_s...B_{31} = A_s...A_{31}$ $B_0...B_{b-1} = A_0...A_{b-1}$ $B_b...B_{s-1} = [A_b...A_{s-1}] \oplus [A_{31-(s+1)}...A_{31}]$ $B_s...B_{31} = A_s...A_{31}$ $B_0...B_{b-1} = A_0...A_{b-1}$ $B_b...B_{\frac{s}{2}-1} = A_b...A_{\frac{s}{2}}$ $B_s...B_{31} = A_s...A_{31}$ $B_0...B_{b-1} = A_0...A_{b-1}$ $B_b...B_{\frac{s}{2}-1} = [A_b...A_{\frac{s}{2}-1}] \oplus [A_{\frac{s}{2}}...A_s]$ $B_{\frac{s}{2}}...B_{31} = A_{\frac{s}{2}}...A_{31}$ $B_0...B_{b-1} = A_0...A_{b-1}$ $B_b...B_{s-1} = [A_b...A_{s-1}] \oplus [A_{32-b-s}...A_{31}]$ $B_s...B_{31} = A_s...A_{31}$ $B_0...B_{b-1} = A_0...A_{b-1}$ $B_b...B_{s-1} = [A_b...A_{s-1}] \oplus [A_s...A_{2*s-1}] \oplus [A_{2*s}...A_{3*s-1}]$ $B_s...B_{31} = A_s...A_{31}$ In the above table, the original address bits of a memory location in main memory are A0 ... A31 and the indexed address bits of a cache are B0 ... B31. The variable b equals the number of bits of a tag used to determine if a referenced location in a cache matches a referenced memory location in main memory, and the variable s represents the most significant bit in the indexed address that is used to reference a location in the cache.

In some embodiments, as described above, the indexing function may be fully customizable rather than hardwired into specialized hardware. In such implementations any desired indexing function may be used for any program and an indexing function may be specially developed for each program, as is described in more detail below.

The processing cost of simple indexing functions such as those that may be implemented using simple logic, arithmetic, and bit manipulation elements or instructions, as are well known in the art, may be relatively low. Multiple indexing functions may be implemented at the lowest level of a cache using such elements without significantly negatively impacting cache access times compared to the best case scenario of prior art caches. In addition, because memory access cycles are so high, more complex indexing functions may be used for higher levels of a cache hierarchy without significantly negatively impacting cache access times compared to the best case scenario of higher level cache accesses.

It should be understood that the example of FIG. 2 is given as an example only and embodiments of the instant inventions are not limited to the arrangement and inclusion of the elements shown. For example, although in the example figure, caches, functional elements, registers, special purpose registers, and cache controllers are shown as distinct elements, in other embodiments, some of those elements may not be included or may be integrated into other elements. It should be recognized the instant inventions may include any sized cache or caches, e.g., from less than about a single kilobyte to more than many megabytes. It should also be recognized that each cache within a cache hierarchy may further be configured to use a different set of indexing functions.

Further, it should be recognized that the instant inventions may include multi-cored or tiled processors and/or multiprocessor systems that share memory resources. In some such embodiments in which a cache is shared, a special purpose register or other input element to a cache controller may also be shared. In some implementations, such special purpose register or other input element may be separate from the processor.

It should also be understood, as mentioned above, that the present invention is not limited to a particular cache type (e.g. instruction cache, unified cache, etc.), or to a cache at all. Other embodiments may include any type of memory, such as memory that is local to one or more processors, memory used to store projected branches, and/or any other memory type.

Figure 3:
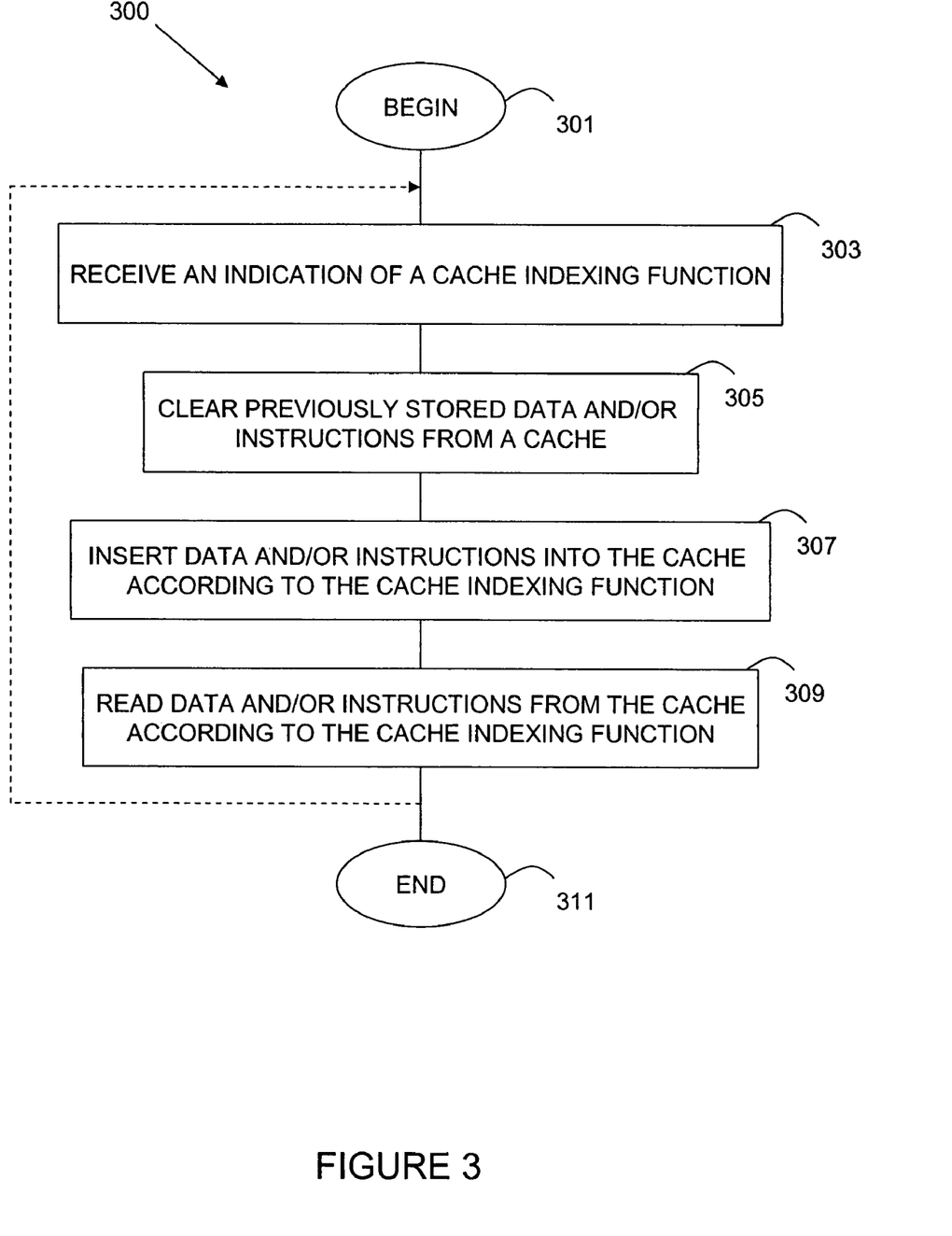
FIG. 3 shows an example process that may be performed in accordance with some embodiments of the instant inventions.

Having described an example architecture of an embodiment of the instant inventions, a process of operation of the example embodiment may be described. FIG. 3 shows an example process 300 that begins at block 301 and that may be performed, for example, by elements of a computer system in accordance with an embodiment of the instant inventions.

As indicated by block 303, process 300 may include changing a cache indexing function. Depending on hardware implementations, changing the cache indexing function may include, for example, selecting a cache indexing function (e.g., inputting data into a multiplexer), writing a new cache lookup table to memory, and/or changing preprocessing operations that may be performed on main memory addresses by a processing element before the cache is addressed. In some implementations, a computer program being executed by a processor may instruct the processor to change indexing functions, e.g. by writing data to a temporary storage location (e.g. special purpose register 209, temporary storage element 217). In some implementations, such an instruction and/or selection through a multiplexer may include receiving and/or transmitting an electronic and/or optical signal to/from a processor and/or processing element.

As indicated at block 305, process 300 may include clearing previously stored data from the cache. Such clearing may be needed so that future reads from the cache using the newly selected indexing function identified at block 303 do not read data that was stored in the cache using a previously used indexing function. Such reading without a clearing of the cache may result in improper data to be provided from the cache. In other implementations, rather than clearing a cache, the elements of a cache may be reordered according to the newly selected indexing function.

As indicated at block 307, process 300 may include inserting data into the cache using the new indexing function. Such data may be inserted into the cache as the data is read from higher level caches or memory.

As indicated at block 309, process 300 may include reading data from the cache using the new indexing function. Such data may be read from the cache and transmitted to a processor or functional element of a processor.

In some implementations, process 300 may end at block 311. In some implementations, process 300 may loop back to block 303 and change to another new indexing function.

As described above, a computer program may instruct a processor to perform various functions, including, in some embodiments of the instant inventions, to select and/or perform an indexing function for use with one or more caches. A computer program typically comprises a set of machine instructions that are executed in sequence by a processor to perform a function. In some implementations, a computer program may include higher level instructions that may be first interpreted by another program. In some implementations, the interpreting program may be referred to as a virtual machine.

Figure 4:
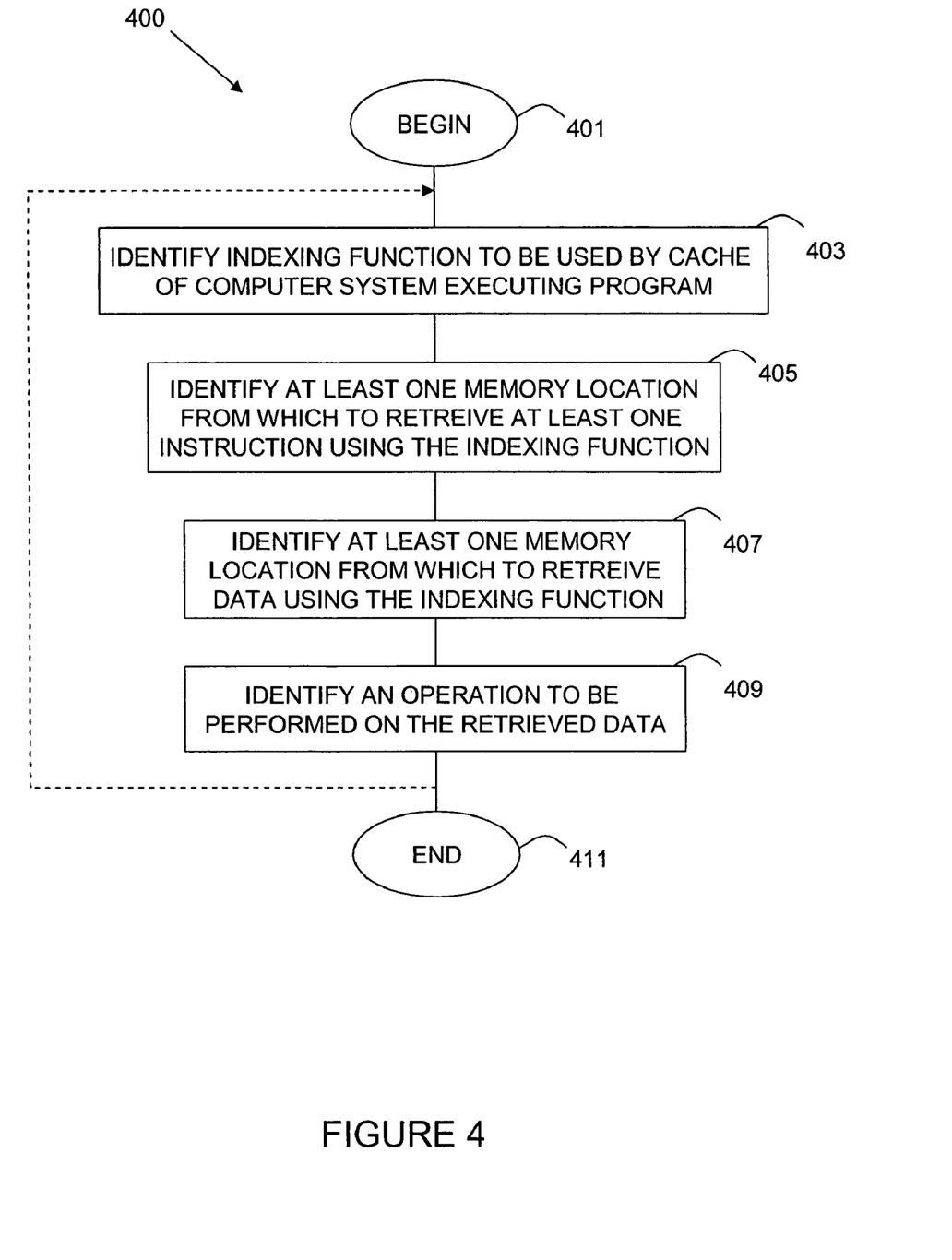
FIG. 4 shows an example process that may be performed by a computer program in accordance with some embodiments of the instant inventions.

FIG. 4 shows a method that begins at block 401 and that may be performed by a computer program in accordance with one aspect some embodiments of the instant inventions. Such a computer program, for example may be executed by general purpose computer system 101 described above, or any other computer systems.

As indicated at block 403, the computer program may identify an indexing function to be used by a cache of a computer system executing the computer program. The computer program, for example may include a machine instruction that identifies the indexing function to the processor of the computer system or a higher level instruction that may be interpreted by a virtual machine that subsequently generates a machine instruction identifying the indexing function to the processor. The process may, in response to such an instruction, arrange to use the indexing function identified and/or perform the indexing function. The identification, may include, for example, a representation of a lookup table that is written into a temporary memory, a set of machine instructions that indicate operations (e.g., adds, xors, modulos, etc.) making up the indexing function, and/or a selection of a hardwired indexing function performed by hardwired specialized hardware.

As indicated at block 405, in some implementations, the computer program may identify a memory location from which one or more instructions may be read. Such identification may take the form of a machine instruction such as a jump instruction or load instructions. A processor executing such an instruction may perform a memory read which may first reference the cache using the identified indexing function.

As indicated at block 407, in some implementations, the computer program may identify at least one memory location from which to read data. Such identification may take the form of a machine instruction such as a load instruction. A processor executing such an instruction may perform a memory read which may first reference the cache using the identified indexing function.

As indicated at block 409, the computer program may identify one or more operations to be performed using retrieved data. Such identification may take the form of a machine instruction, as is well known in the art. It should be recognized that acts 405, 407 and 409 may not be present in every computer program, and may occur in any order if present.

Method 400 may end at block 411 in some implementations when the computer program finishes execution. In some implementations, method 400 may loop back to block 403 when a new indexing function is identified and continue until the end of the computer program's execution.

Computer programs which identify different indexing function during execution and/or computer systems which execute such computer programs may be particularly useful when memory-related behavior of the computer programs changes during execution. Memory-related behavior may include differing patterns of memory references. Such differing behavior is not uncommon in many computer programs and may be attributed for example to special functions being performed by the computer programs, such as start up functions or repeating patters of functions being performed by the computer program. In such computer programs, different indexing function may be preferred as the memory behavior of the computer program changes.

Figure 5:
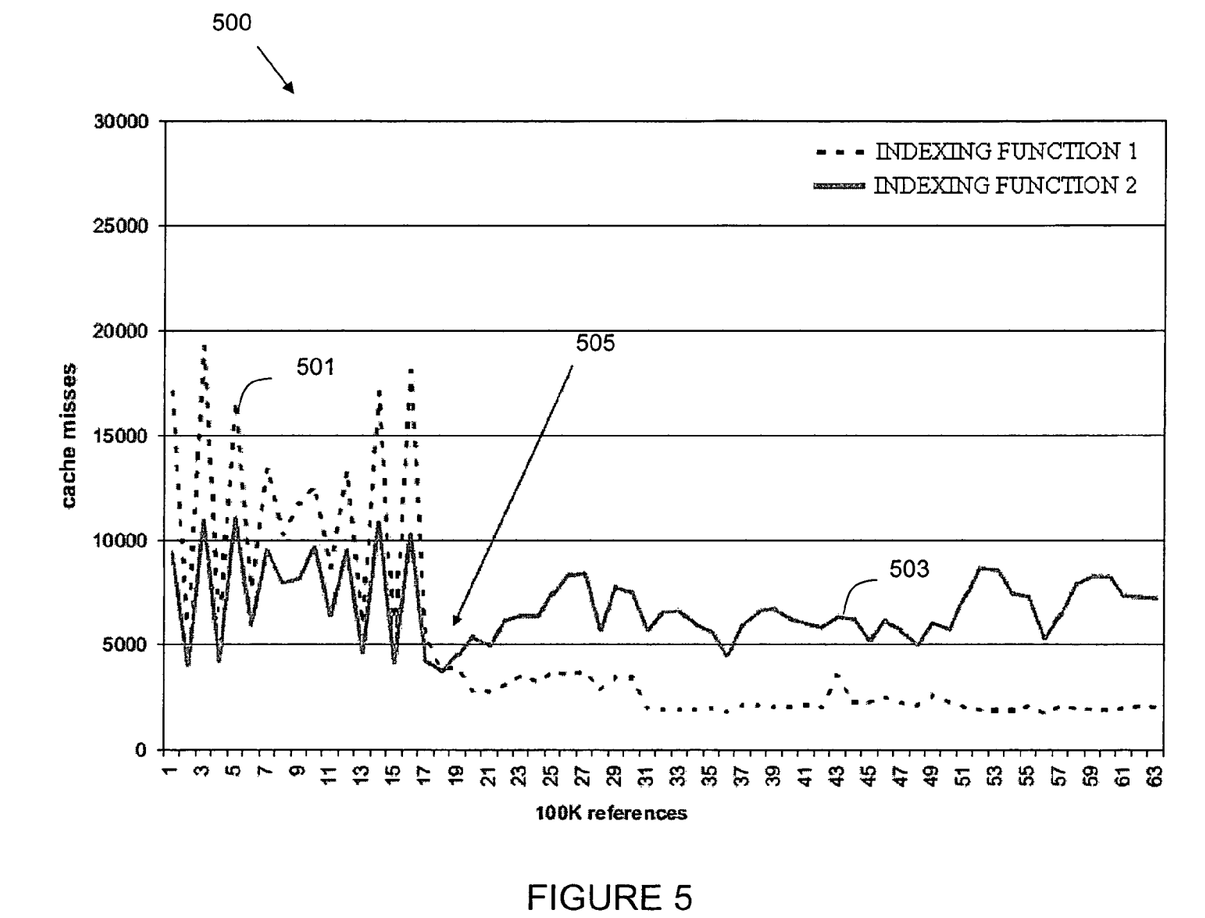
FIG. 5 shows a graph of the efficiency of two example indexing functions throughout the execution of an example program.

FIG. 5 shows a graph 500 of the efficiency of two differing example indexing functions throughout the execution of an example program. As is shown, the first indexing function 501 results in more cache misses during the initial start-up period of the computer program. However, later in the execution of the computer program, the second indexing function 503 results in more cache misses. Before point 505, a computer program would be more efficiently executed using first indexing function, but after point 505, the same computer program would be more efficiently executed using the second indexing function.

In some embodiments of the instant inventions, a computer program may take advantage of the performance advantages of both indexing functions by changing indexing functions at point 505. In the example embodiment, that time may occur when the expected performance of the second indexing function is worse than the expected performance of the first indexing function.

As described above, when a new indexing function is selected, the cache may be cleared of data previously stored in the cache. This clearing of data may result in an increase of cache misses associated with changing the indexing function. Such cache misses may reduce the benefit associated with choosing a new indexing function if the new indexing function is expected to only provide minor or short term improvements in performance.

In some implementations, a heuristic may be used to determine if a new indexing function would result in overall improved expected performance. Such a heuristic may be used for example by a computer programmer determining whether to insert a command or instruction to select a new indexing function and/or by a compiler or virtual machine translating the computer program, as is described below.

One example heuristic may compare a number of expected cache misses associated with changing the indexing function to a number of increased cache hits associated with changing the indexing function. In some implementations, the example heuristic may require that such increased expected cache misses be less than the increased expected cache hits. In some implementations, the heuristic may require that the expected increase cache misses be some factor less than the increase expected cache hits. The factor may be proportional to a difference in latency between the cache and a higher level cache or main memory structure.

In some embodiments, a computer system may identify a new indexing function (e.g., store a new lookup table, select a new hardwired indexing function, perform new indexing instructions) based on characteristics of a computer program. In some implementations, a computer system may monitor execution of the computer program for such characteristics and may identify a new indexing function based on the monitoring. Some example characteristics may include a change in memory reference patterns, a reference to one of a particular set of memory locations (e.g., a memory location that is associated with a particular function and memory reference pattern, a change in cache configurations such as number of partitions into which a cache is divided), a number of operations performed, cache performance of a current indexing function, and/or any other set of characteristics that may be desired.

In some implementations, a computer system or computer program (e.g., a virtual machine) may observe memory references of an application and determine an indexing function that may generate a desired cache performance. In some implementations, the computer system or computer program may adjust an old indexing function to the determined indexing function during execution of the application. In other implementations, the computer system or computer program may associate the application with the determined indexing function for use during a next execution of the application. In some implementations, the computer system or computer program may continue to refine a determined indexing function based on subsequent execution of the application.

Yet another aspect of some embodiments of the instant inventions relates to translating computer programs to be used with a stochastic cache. In one aspect, it is realized that there may be a set of indexing functions that provide optimal or improved indexing to a cache for each program or portion of a program. Translating a computer program for use with a stochastic cache may include inserting instructions identifying an indexing function into a set of machine instructions that represent the computer program. Translating may include compiling and/or interpreting a computer program. Compiling, for example, may generally include well-known techniques associated with various compilers as well as the insertion of such machine instructions. Similarly, interpreting may include well-known techniques associated with various interpreters (e.g., virtual machines) as well as the insertion of such machine instructions. In some implementations, a single such machine instruction or set of such machine instructions may be inserted substantially near the beginning of the set of machine instructions. In other implementations, a plurality of such machine instructions may be inserted throughout the set of machine instructions.

Figure 6:
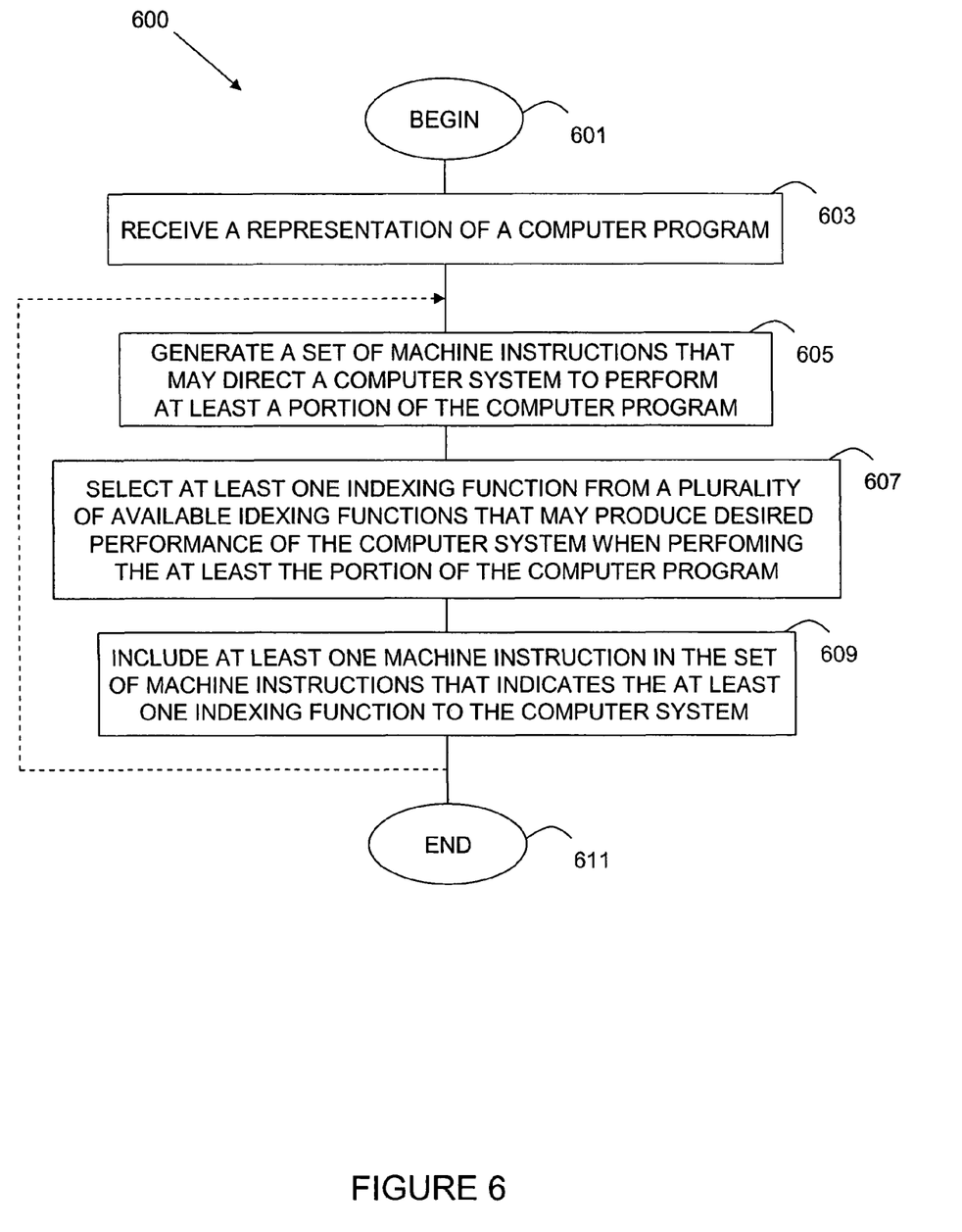
FIG. 6 shows an example process that may be performed to compile and/or interpret a computer program in accordance with some embodiments of the instant inventions.

FIG. 6 shows an example process 600 that begins at block 601 and may be performed to translate a computer program in accordance with some embodiments of the instant inventions. As indicated at block 603, process 600 may include receiving a representation of a computer program. Such a representation, as described above, may include a computer program written in high level computer code, such as C++ or JAVA. The representation may be received, for example, by a computer program, such as a compiler or a virtual machine, being executed by a computer system.

As indicated at block 605, process 600 may include providing a set of machine instructions that may direct a computer system to perform a set of functions defined by the computer program. Such generation may include standard compiling and interpreting operations as are well known in the art.

As indicated at block 607, process 600 may include choosing an indexing function that may produce desired performance of a cache of a computer system that executes the computer program. As described above, such selection may include selecting a single indexing function for the entire computer program or a sequence of indexing functions that may each be used for a portion of the computer program.

In one embodiment, choosing an indexing function may include evaluating and comparing a plurality of indexing functions at a plurality of times during execution of a computer program. In some implementations, the plurality of indexing functions may include the indexing functions that are implemented in hardwired specialized hardware of a computer system. In other implementations, the plurality of indexing functions may not be so limited. Evaluating and comparing the plurality of indexing function may include simulating the performance of each of the cache during execution of the computer program for the plurality of indexing functions. Choosing indexing functions is described in more detail below.

As indicated at block 609, process 600 may include an act of including at least one machine instruction identifying the selected indexing functions in the set of machine instructions. The at least one machine instruction may include, for example, instructions that control the processor to perform the indexing function (e.g., adds, xors, modulos, etc.), that store the result in a temporary storage location (e.g., special purpose register 209, temporary storage element 217), that write a lookup table to a temporary storage location, and/or that select a indexing function available from hardwired specialized hardware. Such instructions, as described above, may be included throughout the set at locations where changing indexing functions may result in improved performance. In other implementations, a single indexing function may be selected at the beginning of the computer program. As indicated, process 600 may end at block 611.

Figure 7:
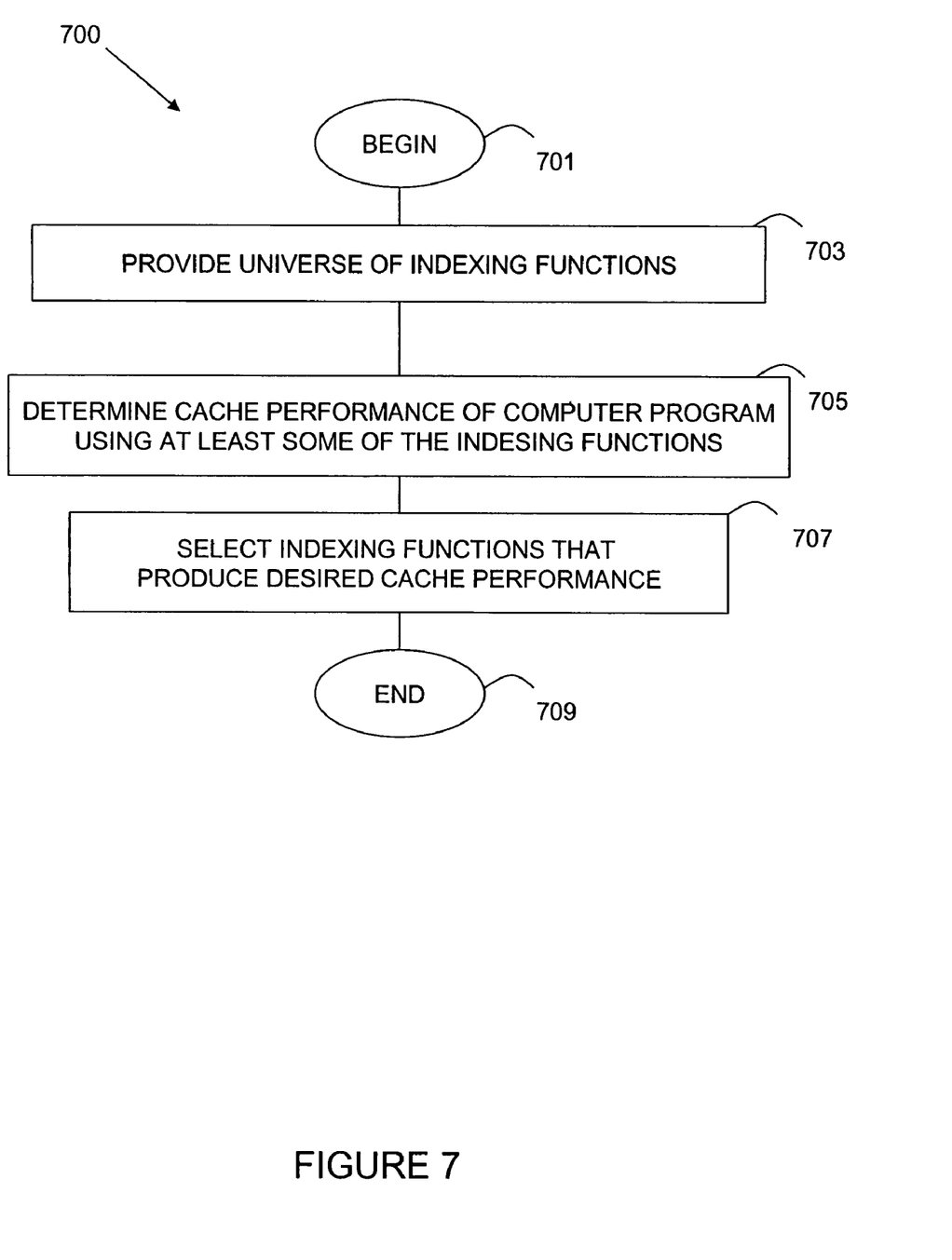
FIG. 7 shows an example process that may be performed to determine a plurality of indexing functions for use by a computer program.

Still another aspect of some embodiments of the instant inventions relates to determine one or more indexing functions for use in execution of a computer program. FIG. 7 illustrates an example process 700 that begins at block 701 and may be used to determine one or more indexing functions.

As indicated at block 703, process 700 may include an act of providing the universe of indexing functions. The universe of indexing functions may include a set of possible indexing functions that may be performed on a memory address in the main memory using less than a maximum number of available arithmetic and/or logic operations. In some implementations, the set of possible indexing functions may be limited by some desired additional constraints. The maximum number may be greater for caches at a higher level in a cache hierarchy. In some implementations, the universe of indexing functions may be provided using a genetic algorithm or machine learning. In other implementations, the universe may be provided using any other algorithm.

As indicated at block 705, process 700 may include an act of determining the cache performance of a computer program. Determining the cache performance may include determining the number of cache hits and misses that would occur at each time during the execution of the computer program if each of the indexing functions were being used to index the cache. In some implementations, determining the cache performance may include determining the cost associated with changing the indexing function at each time of the computer program.

As indicated at block 707, process 700 may include an act of selecting one or more indexing functions. Selecting the one or more indexing functions may include selecting the indexing functions that provide a desired performance based on the determined performance of the cache from block 705. In some implementations, the best performing indexing function at each time may be selected if the cost of changing to that indexing function is less than the benefit of making the change. In other implementations, a single indexing function that provides the best performance for the entire program may be selected.

Process 700 may end at block 709. In some embodiments of process 600, process 700 may be used to perform the functions of block 607.

In still another aspect of some embodiments of the instant inventions, it is recognized that context switching may provide a convenient time for indexing function updating. Because context switching (e.g., switching among the execution of multiple programs by the same processor) generally results in a set of cache misses as a new program begins to be executed by the processor, a new indexing function may be implemented at the same time without causing any or many additional cache misses. This process may be particularly helpful in multitasking operating systems where multiple programs are executed simultaneously by a single processor. In some implementations, an operating system, or virtual machine may be configured monitor context switches and make appropriate indexing function changes, if desired, at each context switch.

It should be recognized that embodiments of the instant inventions are not limited by the descriptions above. Some embodiment of the instant inventions, for example, may include victim cache, as an overflow memory for data removed from caches. Thus some cache misses may be transformed to victim cache hits.

Some implementations may include column associative cache technique to reduce conflict misses for direct-mapped caches. In such implementation, when an address misses in the cache, an alternate indexing function may be used to find an alternate location where the data may be located.

In some implementations, for example, a number of additional compiler techniques aimed at reducing cache conflicts may be employed. In these techniques the compiler, for example, may modify the data layout (e.g., relocating variables and padding array dimensions) and/or modify the execution order to improve temporal data locality. Such data layout, stack alignment, and page allocation techniques may be employed in implementations of the instant inventions.

Having thus described several aspects of at least one embodiment of the instant inventions, it is to be appreciated various alterations, modifications, and improvements will readily occur to those skilled in the art. Such alterations, modifications, and improvements are intended to be part of this disclosure, and are intended to be within the scope of instant inventions. Accordingly, the foregoing description and drawings are by way of example only.

What is claimed is:

1. A method of operating at least one first memory that includes a lower level cache, the method comprising:
    A) receiving a first indication of a first indexing function from a machine readable medium;
    B) receiving a first memory address of a main memory structure that includes a higher level cache;
    C) selecting the first indexing function, wherein selecting the first indexing function includes comparing a first anticipated performance of the at least one first memory using the first indexing function and at least one second anticipated performance of the at least one first memory using at least one second indexing function; and
    D) using the first indexing function and the first memory address to serially search the lower level cache and at least one of the higher level cache and the main memory structure to access the at least one first memory.

2. The method of claim 1, comprising:
    finding the at least one first memory in the higher level cache; and
    updating a cache hierarchy so that each of the lower level cache and the higher level cache contains the first memory address.

3. The method of claim 1, wherein the first indication of the first indexing function includes a selection of the first indexing function out of a plurality of indexing functions that may be performed by a memory controller.

4. The method of claim 3, wherein A includes receiving at least one of an electronic signal representing the selection and an optical signal representing the selection.

5. The method of claim 1, further comprising:
    storing the first indication of the first indexing function in a temporary memory location.

6. The method of claim 1, wherein the first indication includes at least one machine instruction that performs the first indexing function when executed by a processor.

7. The method of claim 1, wherein the first indication includes a representation of a lookup table that maps the first memory address to at least one address of the at least one first memory.

8. The method of claim 1, wherein D includes:
    writing at least one information item to the at least one first memory using the first indexing function and the first memory address; and
    reading the at least one information item from the at least one first memory using the first indexing function and the first memory address.

9. The method of claim 1, further comprising:
    receiving a second indication of the at least one second indexing function;
    receiving a second memory address of the main memory structure; and
    using the at least one second indexing function and the second memory address to access the at least one first memory.

10. The method of claim 9, further comprising:
    clearing the at least one first memory before using the at least one second indexing function and the second memory address to access the at least one first memory.

11. The method of claim 1, further comprising:
    receiving a second selection of the at least one second indexing function; and
    using the second indexing function and the first memory address to access at least one second memory.

12. A method of translating a program, the method comprising:
    A) generating a set of machine instructions for execution by at least one computer system;
    B) including, in the set of machine instructions, at least one first machine instruction identifying at least one first indexing function to be used with at least one first memory of the at least one computer system to search a lower level cache of the first memory and at least one of a main memory structure of the at least one computer system and a higher level cache of the main memory structure to access the at least one first memory; and
    C) selecting the at least one first indexing function, wherein selecting the at least one first indexing function includes comparing a first anticipated performance of the at least one first memory using the at least one first indexing function and at least one second anticipated performance of the at least one first memory using at least one second indexing function.

13. The method of claim 12, wherein the at least one first machine instruction includes instructions to find the at least one first memory, and instructions to update a cache hierarchy that includes the lower level cache and the higher level cache with the at least one first memory.

14. The method of claim 12, wherein the at least one first machine instruction includes a plurality of machine instructions that perform the at least one first indexing function when executed by a processor.

15. The method of claim 12, wherein the at least one first machine instruction includes a lookup table that maps memory locations of the main memory structure to memory locations in the at least one first memory.

16. The method of claim 12, wherein the at least one first machine instruction includes an input for a cache controller selecting one of a plurality of hardwired indexing functions.

17. The method of claim 12, wherein the at least one first machine instruction includes an instruction indicating a write into a temporary memory location.

18. The method of claim 12, further comprising:
including, in the set of machine instructions, at least one second machine instruction identifying the at least one second indexing function to be used with the at least one first memory.

19. The method of claim 18, further comprising:
D) determining a position in the set of machine instruction for the at least one second machine instruction.

20. The method of claim 19, wherein D includes comparing the first anticipated performance of the at least one first memory using the at least one first indexing function and the at least one second anticipated performance of the at least one first memory using the at least one second indexing function.

21. The method of claim 12, further comprising:
including, in the set of machine instructions, at least one second machine instruction identifying the at least one second indexing function to be used with at least one second memory.

22. The method of claim 12, wherein translating includes at least one of compiling and interpreting.

23. A method comprising:
A) controlling a computer system to perform a plurality of desired operations, wherein the plurality of desired operations includes performing at least one first desired indexing function to search a lower level cache and at least one of a higher level cache and a main memory structure to access at least one first memory of the computer system, wherein controlling the computer system comprises selecting the at least one first desired indexing function, wherein selecting the at least one first desired indexing function includes comparing a first anticipated performance of the at least one first memory using the at least one first desired indexing function and at least one second anticipated performance of the at least one first memory using at least one second indexing function.

24. The method of claim 23, comprising:
accessing the at least one first memory; and
updating a cache hierarchy so that each of the lower level cache and the higher level cache contains a first memory address of the main memory structure.

25. The method of claim 23, wherein A includes:
B) identifying at least one memory address of the main memory structure; and
C) searching the at least one first memory using the at least one first desired indexing function for a copy of information stored in the at least one memory address.

26. The method of claim 25, wherein the at least one memory address includes an address of electronic data.

27. The method of claim 23, wherein controlling the computer system to perform the at least one first indexing function to be used by the at least one first memory of the computer system includes selecting the at least one first desired indexing function from among a plurality of indexing functions hardwired in a memory controller.

28. The method of claim 23, wherein controlling the computer system to perform the at least one first indexing function to be used by the at least one first memory of the computer system includes controlling a processor to execute a set of machine instructions that perform the first desired indexing function.

29. The method of claim 23, wherein controlling the computer system to perform the at least one first indexing function to be used by the at least one first memory of the computer system includes storing a lookup table that maps main memory addresses to addresses of the at least one first memory, and referencing the lookup table to access the at least one first memory.

30. The method of claim 23, wherein the plurality of desired operations includes using the at least one second indexing function to access the at least one first memory of the computer system.

31. The method of claim 23, wherein the plurality of desired operations includes using the at least one second indexing function to access at least one second memory of the computer system.

32. An apparatus comprising:
at least one memory element that includes a lower level cache configured to store a plurality of information items; and
at least one processing element configured to access the plurality of information items using a plurality of indexing functions, and configured to select a first indexing function by comparing a first anticipated performance of the at least one memory element using the first indexing function and a second anticipated performance of the at least one memory element using a second indexing function;
the at least one processing element further configured to search the lower level cache and at least one of a main memory structure and a higher level cache of the main memory structure to receive at least one indication of at least one of the plurality of indexing functions.

33. The apparatus of claim 32, wherein the processing element is further configured to update a cache hierarchy that includes the lower level cache and the higher level cache with a first memory address of the main memory structure.

34. The apparatus of claim 32, further comprising at least one special purpose register.

35. The apparatus of claim 34, wherein the at least one processing element is configured to perform the at least one of the plurality of indexing functions and store a result in the at least one special purpose register.

36. The apparatus of claim 32, further comprising at least one memory control element configured to receive a selection of the at least one of the plurality of indexing functions from the at least one processing element, and configured to perform each of the plurality of indexing functions.

37. The apparatus of claim 32, wherein the at least one indication includes a representation of a lookup table.

38. The apparatus of claim 32, wherein the plurality of information items includes at least one of electronic data and optical data.

39. The apparatus of claim 32, wherein the at least one memory element includes a plurality of memory elements configured to operate hierarchically.

40. The apparatus of claim 32, wherein the at least one memory element includes at least one of a direct mapped cache and a set associative cache.

41. The apparatus of claim 32, wherein the at least one processing element includes a plurality of processing elements.

* * * * *

UNITED STATES PATENT AND TRADEMARK OFFICE
CERTIFICATE OF CORRECTION

| | | |
|---|---|---|
| PATENT NO. | : 7,856,529 B2 | |
| APPLICATION NO. | : 11/786581 | |
| DATED | : December 21, 2010 | |
| INVENTOR(S) | : Shripad Nagarkar et al. | |

It is certified that error appears in the above-identified patent and that said Letters Patent is hereby corrected as shown below:

In the Specifications:
At column 1, line 3, insert:

--Statement Regarding Federally Sponsored Research or Development:
This invention was made with government support under grant number NBCH1040009 awarded by the Defense Advanced Research Projects Agency. The government has certain rights in this invention.--

Signed and Sealed this
Fifteenth Day of March, 2011

David J. Kappos
*Director of the United States Patent and Trademark Office*